D. NÉMETH.
MACHINE FOR SHAPING AND CUTTING DOUGH.
APPLICATION FILED JUNE 3, 1908.

934,749.

Patented Sept. 21, 1909.
2 SHEETS—SHEET 1.

WITNESSES:
S. Birnbaum
Thos Veitch

INVENTOR
Dezső Németh
BY
Sigmund Herzog
ATTORNEY

D. NÉMETH.
MACHINE FOR SHAPING AND CUTTING DOUGH.
APPLICATION FILED JUNE 3, 1908.
934,749.
Patented Sept. 21, 1909.
2 SHEETS—SHEET 2.
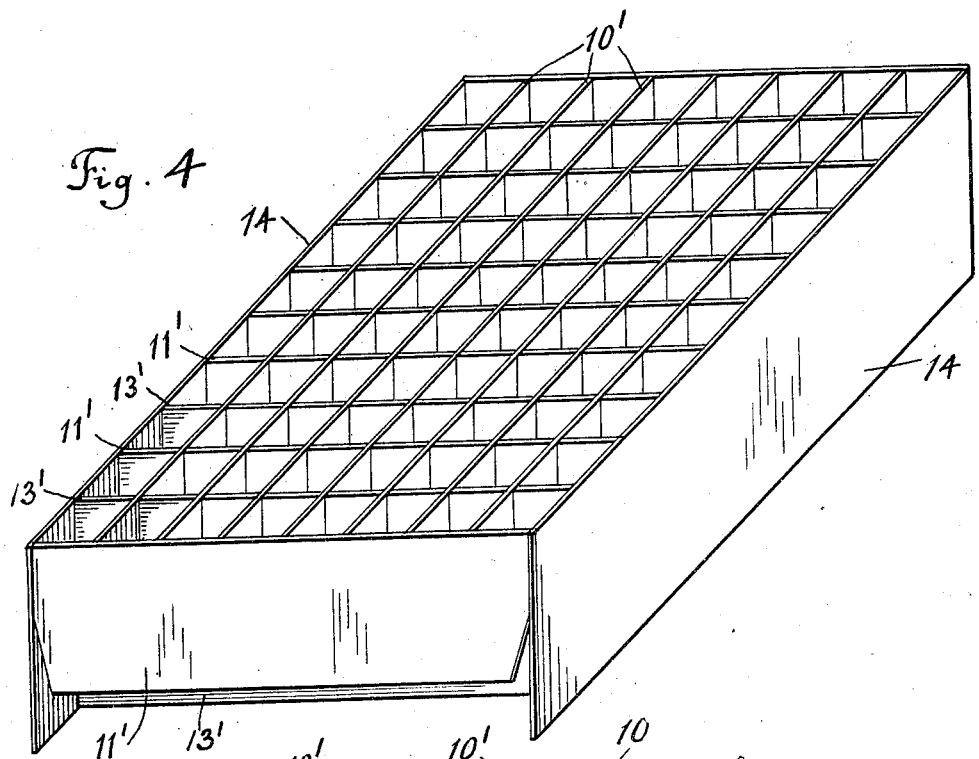
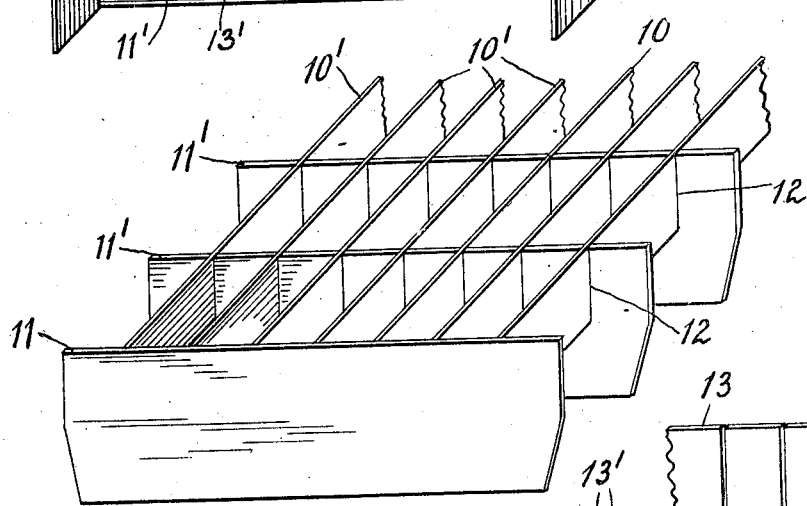
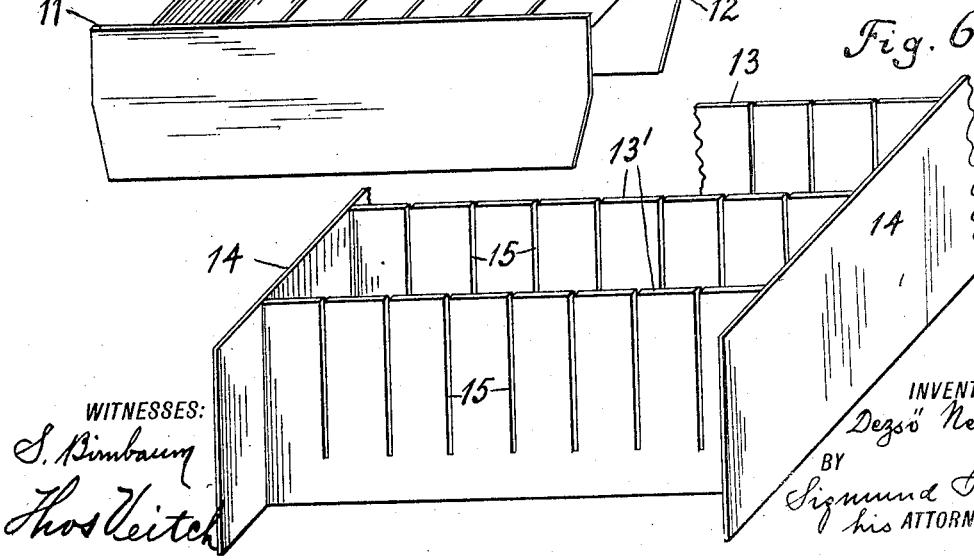
WITNESSES:
S. Birnbaum
Thos Veitch
INVENTOR
Dezső Németh
BY
Sigmund Herzog
his ATTORNEY

UNITED STATES PATENT OFFICE.

DEZSÖ NÉMETH, OF NEW YORK, N. Y.

MACHINE FOR SHAPING AND CUTTING DOUGH.

934,749.
Specification of Letters Patent.
Patented Sept. 21, 1909.

Application filed June 3, 1908. Serial No. 436,352.

*To all whom it may concern:*

Be it known that I, DEZSÖ NÉMETH, a subject of the King of Hungary, and a resident of the city of New York, in the county of New York and State of New York, have invented certain new and useful Improvements in Machines for Shaping and Cutting Dough, of which the following is a specification.
This invention relates to machines for the use of bakers, and more particularly to machines for flattening, shaping and cutting the dough.

The object of the invention is to provide a device of this general character, having a plurality of series of cutting devices which may operate independently of each other, and thus cut and divide the dough into pieces of a predetermined size, depending on the number of series of knives or cutters operating.

Another object of the invention is to provide a flattening and shaping device which may consist of a plurality of plungers operating independently of and between the cutting devices.

The invention consists in the features of construction and combination of parts, hereinafter described.

Broadly speaking, it consists of a plurality of series of reciprocating knives or cutting devices, some of the series of knives operating independently of the other. These knives are crossed at right angles, forming thus guides for the shaping and flattening plungers, which act before the knives in order to flatten and shape the dough.

Figure 1:
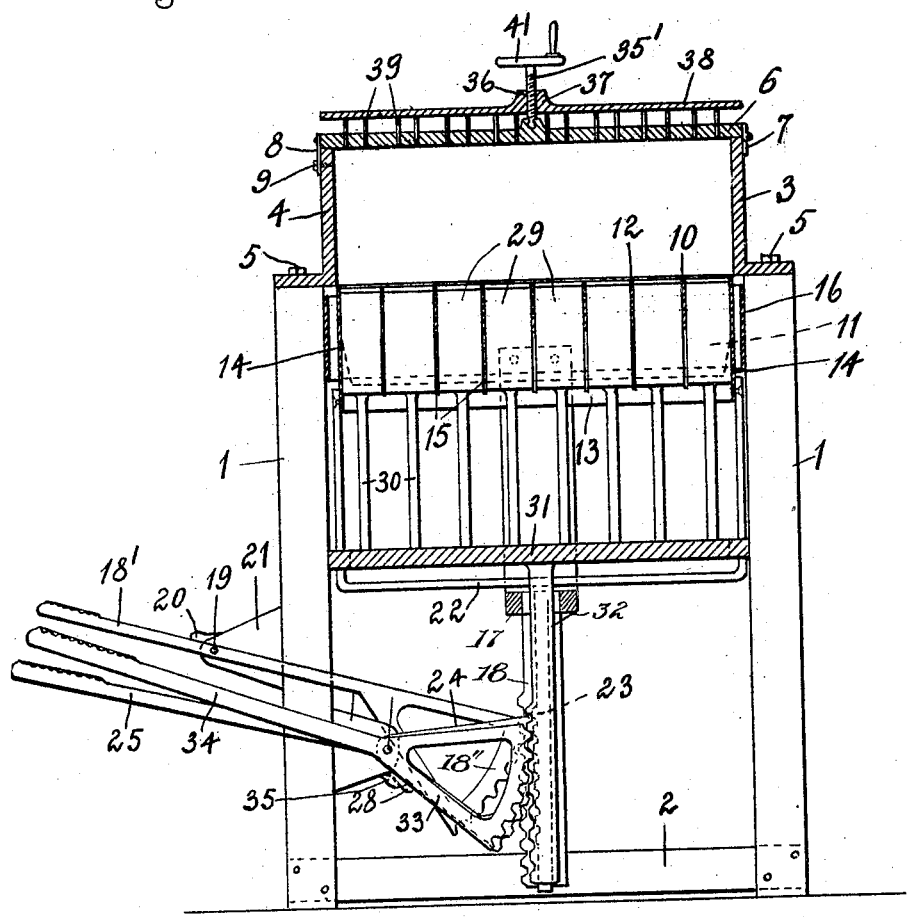
Figure 2:
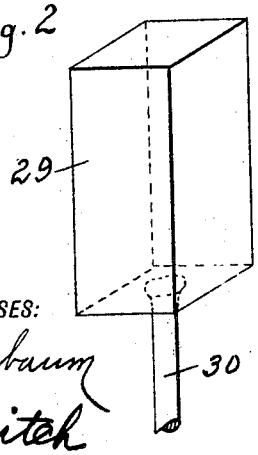
Figure 3:
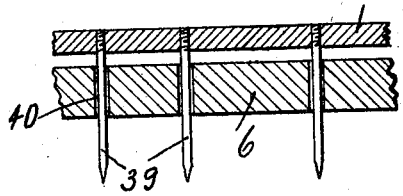

In the drawings, Figure 1 is a vertical section of the machine, Fig. 2 a perspective view of one of the flattening and shaping plungers, Fig. 3 a detail of construction. Fig. 4 is a perspective view of the cutting device, Fig. 5 a similar view of two series of knives, arranged at right angles to each other and operating together, and Fig. 6 is a perspective view of a third series of knives operating independently of said first series of knives.

The machine, in the form shown, comprises a main frame, consisting of standards or uprights 1, 1, held together by bottom rails 2, 2. Upon this main frame is arranged a dough-box 3, consisting of sides 4, 4, secured to the main frame by means of screws 5 or in any other suitable manner. This dough-box is provided with a cover 6, hinged to the box at 7, and provided with a locking device 8, coacting with the locking pin 9, arranged on the dough-box. As shown in the drawings, the dough-box has no bottom and the dough, placed therein, rests directly on the flattening plungers, hereinafter to be described.

The cutting device, consisting of a plurality of knives, is divided in this case into three series. The first series is indicated at 10 and the second series, crossing the same, at 11. These two series of knives are fastened together in any suitable way and thus cut the dough at the same time. More particularly, the series 11 consists of flat blades 11' having slots 12, receiving the knives 10', so that the cutting edges of both series of knives are located in one plane. The knives 10', being placed into the slots 12 of the knives 11', are soldered thereto, or may be fixedly secured thereto in any other manner, it being, however, essential that the surfaces of the blades should form smooth planes, so as to serve as guides for the flattening and shaping dies. It will be noticed from Fig. 5, of the drawings, that these two series of knives cut the dough into solids having oblong bases, the length of which corresponds substantially to twice the breadth of the same.

A third series of cutting knives is indicated at 13, the blades 13' of which are secured to the blades 14, arranged at right angles to the knives 13'. These knives are provided with slots 15, adapted to receive the knives, hereinbefore described. The length of the slots 15 is substantially greater than the height of the knives 10', and it will be thus observed, that the knives 13' may be reciprocated relative to the knives 10' and 11', and the cutting edges of the knives 13' be raised above the plane of the cutting edges of the knives 10' and 11', and independently thereof. As shown in Fig. 4, the knives 13' are arranged at equal distances between the knives 11'.

The knives 10' and 11' are reciprocated between guides 16, formed on the uprights or standards 1, and carry a yoke 17, attached to the two outermost blades 11'. To this yoke is attached a rack 18, which meshes with a segment gear 18″, the operating lever 18′ of which is fulcrumed at 19 to the frame of the machine. It is obvious that in forcing the free end of the operating lever downward, the cutting edges 10′ and 11′ will be raised into the dough-box 3 and there guided by the sides 4 of the same. Normally the plane of the cutting edges of the knives is in the plane in which the lowermost edges of the dough-box are located, and are held in this position by a finger 20, engaging the operating lever 18′, which finger is secured to or made integral with the bracket 21, to which the operating lever is pivoted.

The operating mechanism of the knives 13′ comprises a yoke 22, secured to the blades 14. This yoke is attached to a rack 23, which meshes with a segment 24, carrying an operating lever 25, fulcrumed at 26 to a bracket 27, which, in turn, is attached to the frame of the machine.

As hereinbefore mentioned, the knife series 13 may be operated independently of the series 10 and 11, that is to say, the series 10 and 11 may be raised into the dough-box independently of the series 13, or in other words, the series 13 may remain stationary and the series 10 and 11 raised. In a similar manner series 13 may be raised and the series 10 and 11 remain stationary by reason of the slots 15.

A stop 28, arranged on the bracket 27 and engaging the operating lever 25, determines the lowermost position of the knives 13′, in which position the cutting edges of these series are located in the plane of the cutting edges of series 10 and 11.

The flattening and shaping dies comprise a plurality of plungers 29, being solids having a square base and guided by the cutting knives. The lower parts of these plungers carry stems 30, secured to a support 31, to which is attached a rack 32, meshing with a segment 33, to which is attached an operating lever 34, fulcrumed at 26 to the bracket 27. A lug 35 engages the segment for a similar purpose as the lug 28 engages the segment 24.

On the cover 6 of the dough-box is rotatably arranged a screw bolt 35′, engaging the threads 36 of a projection 37, made integral with a pricking needle carrier 38. The pricking needles 39 are attached to this carrier 38, and are so arranged that two needles may be lowered into each square formed by cutting knives 10′, 11′ and 12′, respectively. These needles slide into holes 40, provided on the cover 6, and are held normally out of the dough-box. A hand-wheel 41 facilitates the turning of the screw bolt 35.

The operation of the device is as follows: The dough is placed into the dough-box and will rest, as mentioned hereinbefore, on the plungers 29, which are shown in their lowermost position in Fig. 1, of the drawings. The cover 6 is closed and the locking means 8 and 9 brought into engagement. When now the operating lever 34 is forced downward, the plungers 29 will flatten and shape the dough so that it will obtain the shape of the dough-box, that is a solid having an oblong base, the height of which corresponds to the height of the dough-box less the length of travel of the plungers 29. If such a sheet of dough is desired, the cutting devices are not brought into operation, but the hand-wheel is turned and then the pricking performed, after which operation the cover of the dough-box is opened and the dough sheet readily taken out of the receptacle. Should it be desired to cut the already flattened and shaped dough into oblong portions, the length of which is equal to the width of the dough-box, the knives 13′ are brought into operation by means of the operating lever 25, and then the pricking performed and the portions taken out of the receptacle. In this case oblong dough portions are obtained, the length of which corresponds to the width of the receptacle and the breadth of which is equal to the distance in which the knives 13′ are set on the blades 14. If it is necessary to divide the dough into smaller portions, then, after shaping and flattening, the knives 10′ and 11′ are operated by the lever 18′. In this case solids are obtained, the length of the base of which corresponds to the distance in which the knives 11′ are set, and the breadth of the base of which is equal to the distance of the knives 10′ to each other. In other cases it becomes necessary to divide the dough into solids having a square base. In this case, first, the knives 10′ and 11′ operate, and then the knives 13′ are forced upward and divide thus the dough into the desired portions. It is obvious that the plungers 29 are held in their upper positions during the operation of the knives.

What I claim is:

1. In a device of the character specified, the combination with a dough-box, of knives for dividing the dough, and means normally outside of said box and adapted to project through the cover thereof for pricking the dough in the same.

2. In a device of the character specified, the combination with a dough-box, of means normally outside of said box and adapted to project through the cover thereof for pricking the dough in said box.

3. In a device of the character specified, the combination with a dough-box, of a plurality of pricking pins adapted to project through the cover thereof and normally kept outside of said box, and means for actuating all of said pins simultaneously.

4. In a device of the character specified, the combination with a dough-box consisting of the sides and a cover, of two series of knives crossed at right angles for dividing the dough, a third series of knives guided by one of said two series of knives, a plurality of plungers adapted to support the dough and operating between said knives and independently thereof, and means on said cover for pricking the dough in said box.

Signed at New York, in the county of New York and State of New York, this 23rd day of March, A. D. 1908.

DEZSÖ NÉMETH.

Witnesses:
 FRANK C. BRUTON,
 CHARLES STIRIZ.